US007966681B2

(12) United States Patent
Harris

(10) Patent No.: US 7,966,681 B2

(45) Date of Patent: Jun. 28, 2011

(54) MULTI-FUNCTION PIPE CUTTING AND FITTING TOOL

(76) Inventor: Robert Harris, Acton, CA (US)

( * ) Notice: Subject to any disclaimer, the term of this patent is extended or adjusted under 35 U.S.C. 154(b) by 170 days.

(21) Appl. No.: 12/427,604

(22) Filed: Apr. 21, 2009

(65) Prior Publication Data

US 2010/0263499 A1 Oct. 21, 2010

(51) Int. Cl.
*B25F 1/04* (2006.01)
*B23D 21/06* (2006.01)

(52) U.S. Cl. .................................... 7/142; 30/92; 30/251

(58) Field of Classification Search .............. 7/131, 134, 7/142; 81/300, 314, 318, 360, 420; 30/92, 30/251

See application file for complete search history.

(56) References Cited

U.S. PATENT DOCUMENTS

| | | | | |
|---|---|---|---|---|
| 1,276,323 | A * | 8/1918 | Buresch | 53/344 |
| 4,186,484 | A * | 2/1980 | Tanaka | 30/92 |
| RE30,613 | E * | 5/1981 | Nakamura et al. | 30/94 |
| 4,368,577 | A | 1/1983 | Babb | |
| 5,511,314 | A * | 4/1996 | Huang | 30/251 |
| 5,718,051 | A | 2/1998 | Huang | |
| 6,305,087 | B1 | 10/2001 | Huang | |
| D497,784 | S | 11/2004 | Picaza | |
| 7,127,819 | B1 | 10/2006 | Huang | |
| D581,233 | S * | 11/2008 | Sullivan | D8/60 |
| 2004/0129116 | A1* | 7/2004 | Norin | 81/300 |
| 2009/0277310 | A1* | 11/2009 | Bell | 81/309 |

* cited by examiner

*Primary Examiner* — David B Thomas

(74) *Attorney, Agent, or Firm* — Kelly Lowry & Kelley, LLP

(57) ABSTRACT

A multi-function pipe cutting and fitting tool includes a spring biased connecting rod, a pair of plier teeth and a pair of friction teeth. The spring biased connecting rod improves the pipe cutting function of the tool by improving the operation of a movable jaw toward engagement of a fixed jaw. The pair of plier teeth positioned on one side of the tool allows a user to firmly grip a pipe or other object to be held in place. The pair of friction teeth positioned on an opposite side of the tool allows a user to more reliably engage an object such as a cap on a can of glue. The inclusion of all of these features in the same tool allows a user to perform multiple functions easily and more rapidly.

18 Claims, 6 Drawing Sheets

MULTI-FUNCTION PIPE CUTTING AND FITTING TOOL

BACKGROUND OF THE INVENTION

The present invention relates generally to a multi-function pipe cutting and fitting tool. More particularly, it relates to a pair of shears for cutting pipe and including pairs of plier teeth and friction teeth.

Conventional pipe shears are useful for cutting pipe and other articles made of rigid plastic material. However, when an artisan uses conventional pipe shears they typically need to perform other related functions. Such related functions may include gripping or twisting a piece of pipe as with a set of pliers. The related functions may also include gripping or twisting a cap as on a container of glue. In cutting pipe or performing any of the related functions an artisan usually finds that he must set down one tool and pick up another tool.

Accordingly, there is a need for a tool that allows an artisan to perform a pipe cutting operation as well as related functions with the use of a single tool. The present invention fulfills this need and provides other related advantages.

SUMMARY OF THE INVENTION

The present invention is directed to a multi-function pipe cutting and fitting tool. A conventional pipe cutting tool has a fixed handle having a fixed jaw and a pivoting handle pivotally attached to the fixed handle adjacent to the fixed jaw. A movable jaw is pivotally attached to the fixed handle opposite the fixed jaw and configured to engage the fixed jaw. A push pawl is pivotally attached to the pivoting handle and has a cantilever spring pin biasing the pawl against the movable jaw. Upon squeezing the fixed and pivoting handles together, the push pawl engages ratchet teeth on the movable jaw to urge the movable jaw into engagement with the fixed jaw.

The multi-function pipe cutting and fitting tool comprises a connecting rod having a first end pivotally attached to the pivoting handle and an opposite second end pivotally attached to the movable jaw. A biasing spring is attached at one end to the connecting rod and at another end to the fixed handle such that the connecting rod is biased toward the fixed handle. The connecting rod preferably comprises first and second members that are hingedly connected. The first part of the connecting rod, which is pivotally attached to the pivoting handle, is part of the first member. The second end of the connecting rod, which is pivotally attached to the movable jaw, is part of the second member. The biasing spring is preferably attached to the second member such that the second member is biased toward the fixed handle.

The multi-function pipe cutting and fitting tool further comprises a pair of teeth on a side of the fixed and pivoting handles proximate to the attachment of the pivoting handle to the fixed handle. The pair of teeth may comprise a pair of plier teeth positioned in an opposing configuration. The pair of plier teeth are configured such that moving and pivoting handle closer to the fixed handle causes the plier teeth to move closer together thereby firmly gripping an object placed between the pair of plier teeth. The pair of teeth may also comprise a pair of friction teeth positioned in a cooperative configuration. The pair of friction teeth are configured such that moving the pivoting handle closer to the fixed handle causes the friction teeth to angle together thereby engaging an object placed within the pair of friction teeth. Where the pair of plier teeth and pair of friction teeth are both included with the multi-function pipe cutting and fitting tool, one set of teeth is positioned on a first side of the fixed and pivoting handles and the other set of teeth is positioned on an opposite second side of the fixed and pivoting handles.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
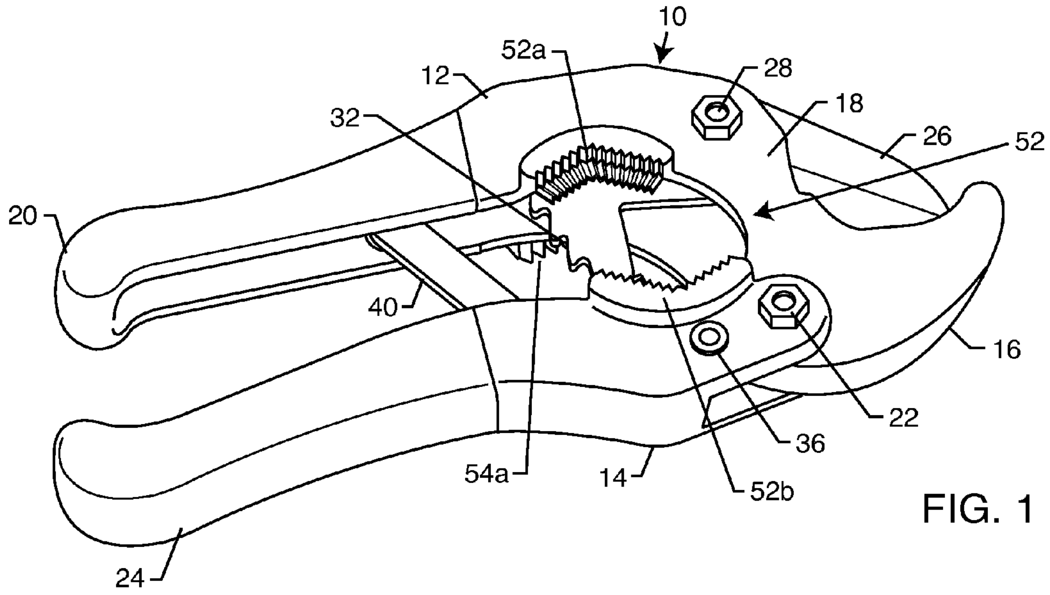
FIG. 1 is an elevated orthogonal view of a multi-function pipe cutting and fitting tool embodying the present invention.
Figure 2:
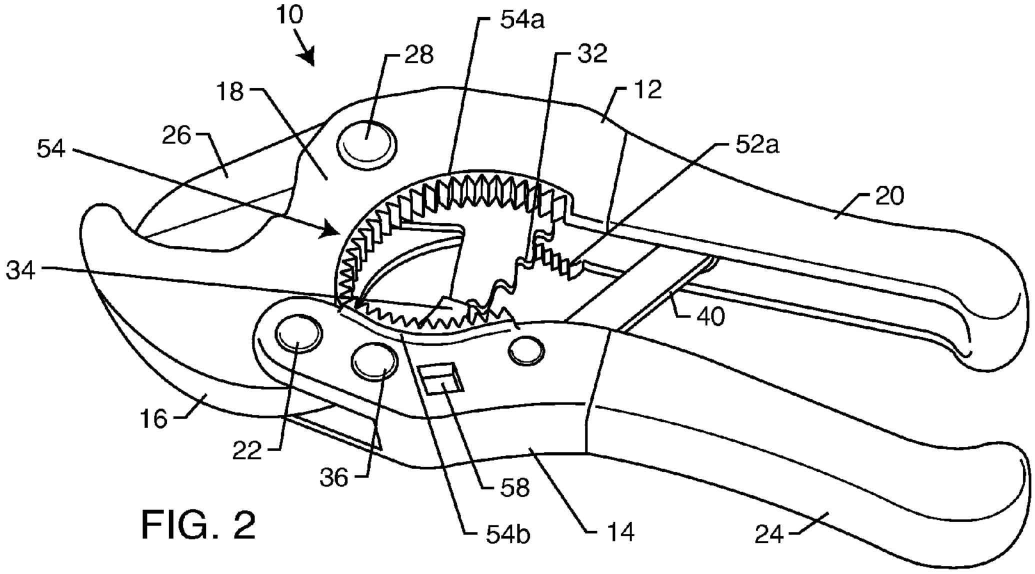
FIG. 2 is an elevated orthogonal view of the multi-function pipe cutting and fitting tool of FIG. 1 from the other side.

The multi-function pipe cutting and fitting tool, generally referred to in the figures by reference numeral 10, is depicted in FIGS. 1, 2 and 4-9. The tool 10 is generally comprised of a fixed handle 12 and a pivoting handle 14. The fixed handle 12 includes a fixed jaw 16 and generally includes an offset 18 such that the fixed jaw 16 is not in alignment with a handle 20 on the fixed handle 12.

The pivoting handle 14 is pivotally attached by a pin 22 to the fixed handle 12 adjacent to the fixed jaw 16. The pivoting handle 14 pivots about the pin 22 such that a handle 24 of the pivoting handle 14 can be moved closer to and farther away from the handle 20 of the fixed handle 12. The handles 20, 24 are configured to be grasped by the hand of an artisan or other person using the tool 10.

The tool 10 also includes a movable jaw 26 which is pivotally attached by a pin 28 to the fixed handle 12. The movable jaw 26 is attached to the fixed handle 12 at a point along the offset 18 such that the movable jaw 26 may engage the fixed jaw 16 as it pivots about the pin 28. The movable jaw 26 includes a blade 30 which is configured to cut a pipe when engaging the fixed jaw 16 as described more fully below. The movable jaw 26 also includes a set of ratchet teeth distal from the blade 30.

The tool 10 further includes a push pawl 34 which is pivotally attached to the pivoting handle 14. A cantilever spring pin 36 biases the push pawl 34 into engagement with the ratchet teeth 32 on the movable jaw 26. The push pawl 34 and ratchet teeth 32 are configured such that when the handles 20, 24 are squeezed together the push pawl 34 engages the ratchet teeth 32 urging the movable jaw 26 into engagement with the fixed jaw 16.

The tool 10 further includes a connecting rod 38 that includes a first member 40 and a second member 42 which are hingedly connected to one another by a pin 44. A first end 46 of the connecting rod 38 which is on the first member 40 is pivotally attached to the pivoting handle 14. An opposite second end 48, which is on the second member 42, is pivotally attached to the movable jaw. The connecting rod 38 includes a biasing spring 50 which is attached at one end to the second member 42 and at the opposite end to the fixed handle 12. The biasing spring 50 biases the second member 42 toward the fixed handle 12. The operation of the connecting rod 38 together with the biasing spring 50 aides in urging the movable jaw 26 into engagement with the fixed jaw 16 and keeping the movable jaw 26 in engagement with the fixed jaw 16 as the handles 20, 24 are squeezed together and released.

The tool 10 further includes a pair of plier teeth 52 positioned on a first side of the fixed handle 12 and pivoting handle 14. One of the pair of plier teeth **52*a* is positioned on the fixed handle 12 adjacent to the offset 18. The other pair of plier teeth 52*b* is positioned on the pivoting handle 14 adjacent to its point of attachment to the fixed handle 12. In this way the pair of plier teeth 52 are arranged in an opposing configuration. When the handles 20, 24 are moved closer together the plier teeth 52*a*, 52*b* also move closer together. Any object that is between the pair of plier teeth 52 and of sufficient size will be firmly gripped when the pair of plier teeth 52** are moved sufficiently close.

The tool 10 also includes a pair of friction teeth 54. The friction teeth 54 are attached to a second side of the fixed handle 12 and pivoting handle 14 opposite from the first side on which the pair of plier teeth 52 are attached. One of the pair of friction teeth **54*a* are attached to the fixed handle 12 in the offset 18. The other of the pair of friction teeth 54*b* are attached to the pivoting handle 14 adjacent to its point of attachment to the fixed handle 12. The friction teeth 54*a*, 54*b* are arranged in a cooperative configuration such that when the handles 20, 24 are moved closer together the pair of friction teeth 54 angle together thereby engaging an object of sufficient size placed within the pair of friction teeth 54**.

Figure 3:
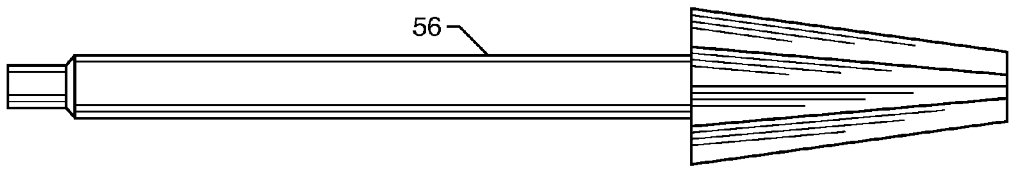
FIG. 3 is a view of a removal tool of the multi-function pipe cutting and fitting tool of the present invention.
Figure 4:
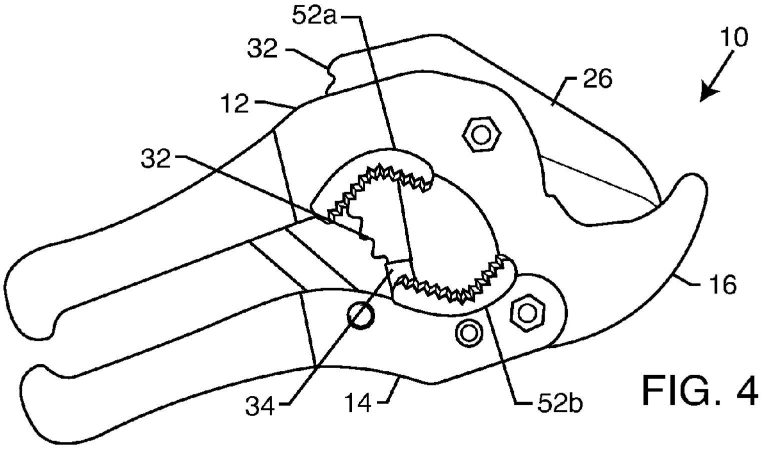
FIG. 4 is a front view of the multi-function pipe cutting and fitting tool of FIG. 1 with the movable jaw fully engaging the fixed jaw.
Figure 5:
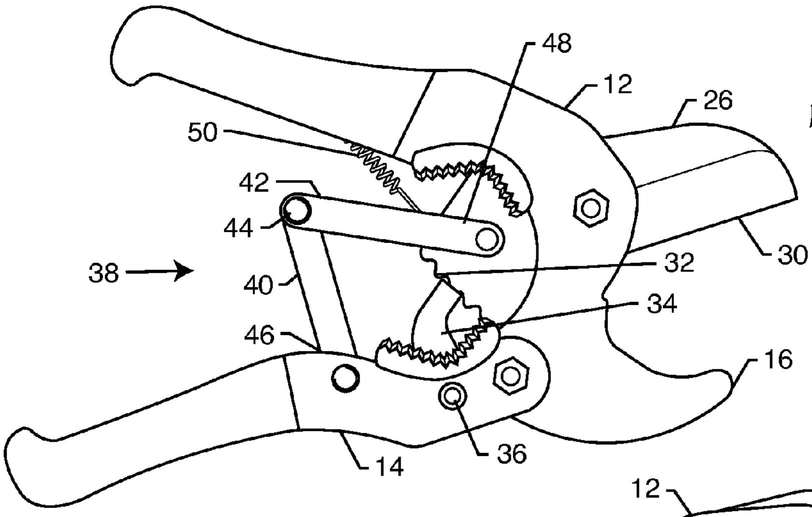
FIG. 5 is a front view of the multi-function pipe cutting and fitting tool of FIG. 1 with the movable jaw disengaged from the fixed jaw and the pivoting handle moved away from the fixed handle.
Figure 6:
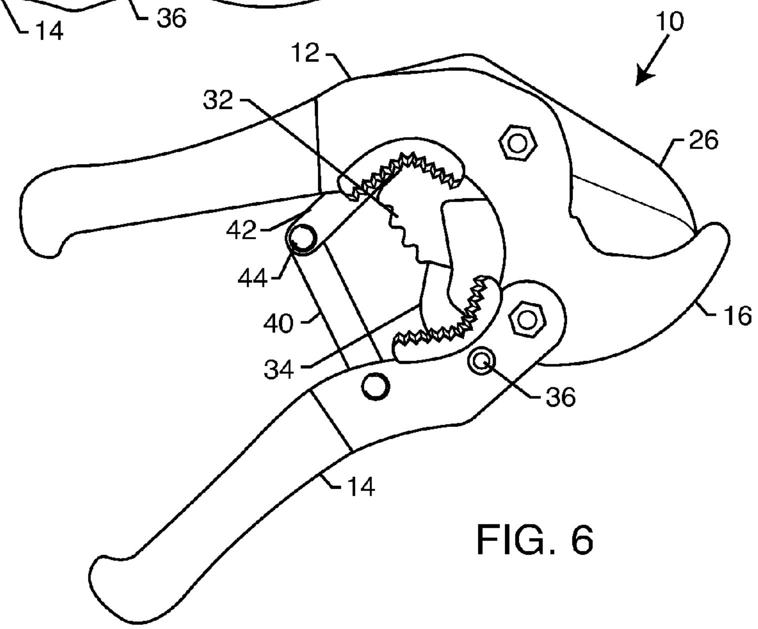
FIG. 6 is a front view of the multi-function pipe cutting and fitting tool of FIG. 1 with the movable jaw engaged with the fixed jaw and the pivoting handle moved away from the fixed handle.
Figure 7:
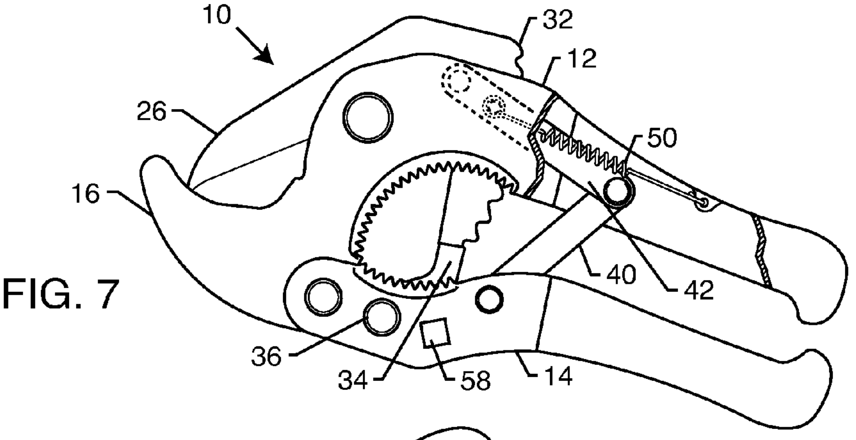
FIG. 7 is a back view of the multi-function pipe cutting and fitting tool of FIG. 4.
Figure 8:
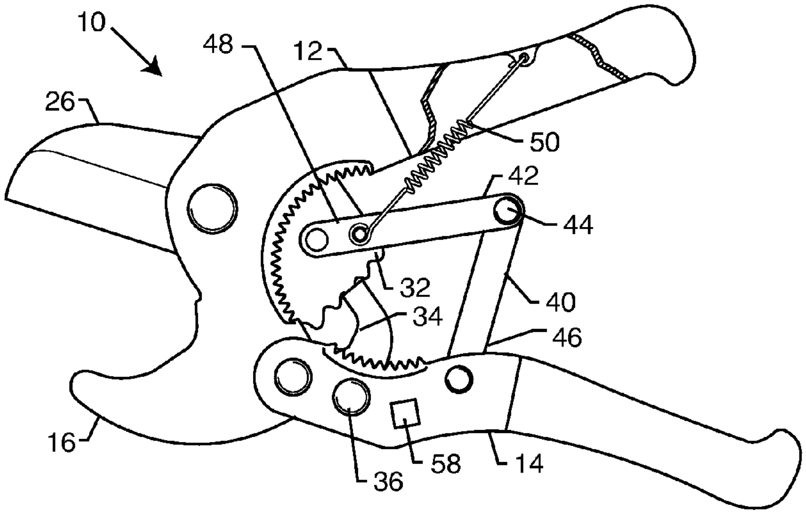
FIG. 8 is a back view of the multi-function pipe cutting and fitting tool of FIG. 5.
Figure 9:
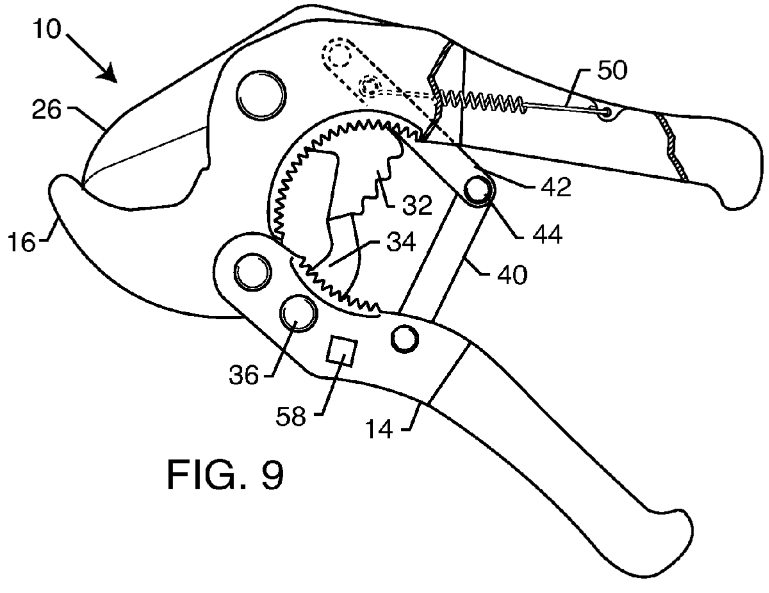
FIG. 9 is a back view of the multi-function pipe cutting and fitting tool of FIG. 6.

FIG. 3 illustrates a removal tool 56. The removal tool 56 is configured to engage a slot 58 in the pivoting handle 14. Engagement of the removal tool 56 with the slot 58 results in disengagement of the push pawl 34 from the ratchet teeth 32. When the push pawl 34 no longer engages the ratchet teeth 32, the movable jaw 26 is released from its engagement with the fixed jaw 16. Use of the removal tool 56 may be necessary during or after the tool 10 has been used to cut a piece of pipe.

Figure 10:
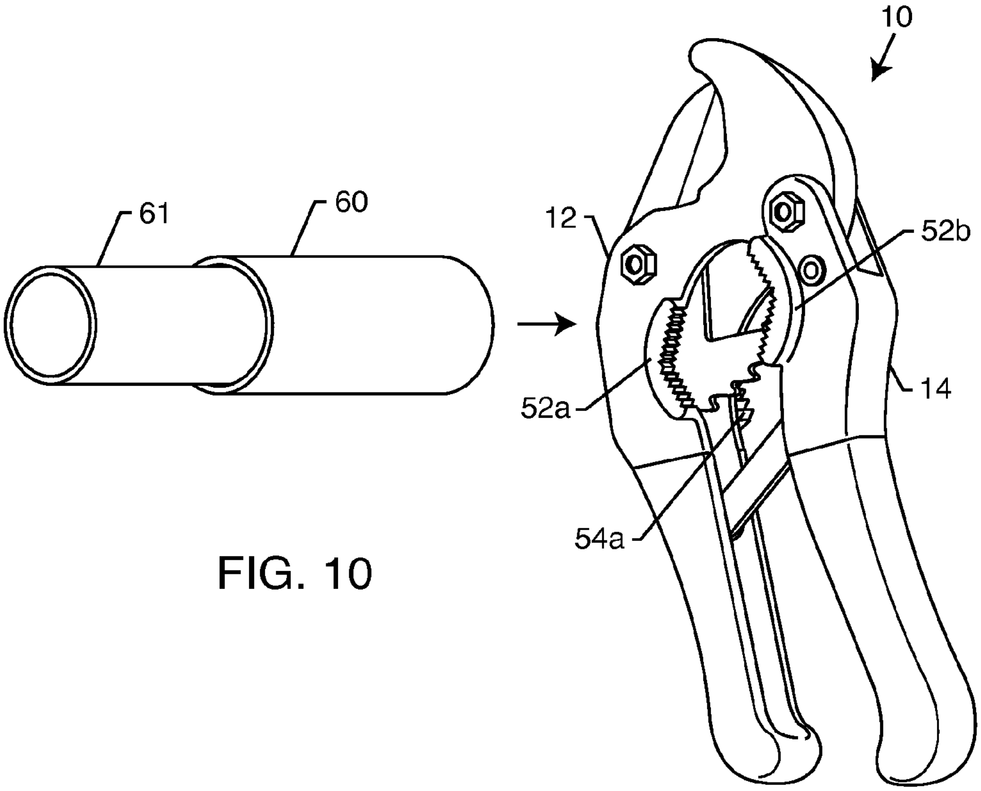
FIG. 10 is an orthogonal view of the multi-function pipe cutting and fitting tool of FIG. 1 accepting a pipe into the pair of plier teeth.
Figure 11:
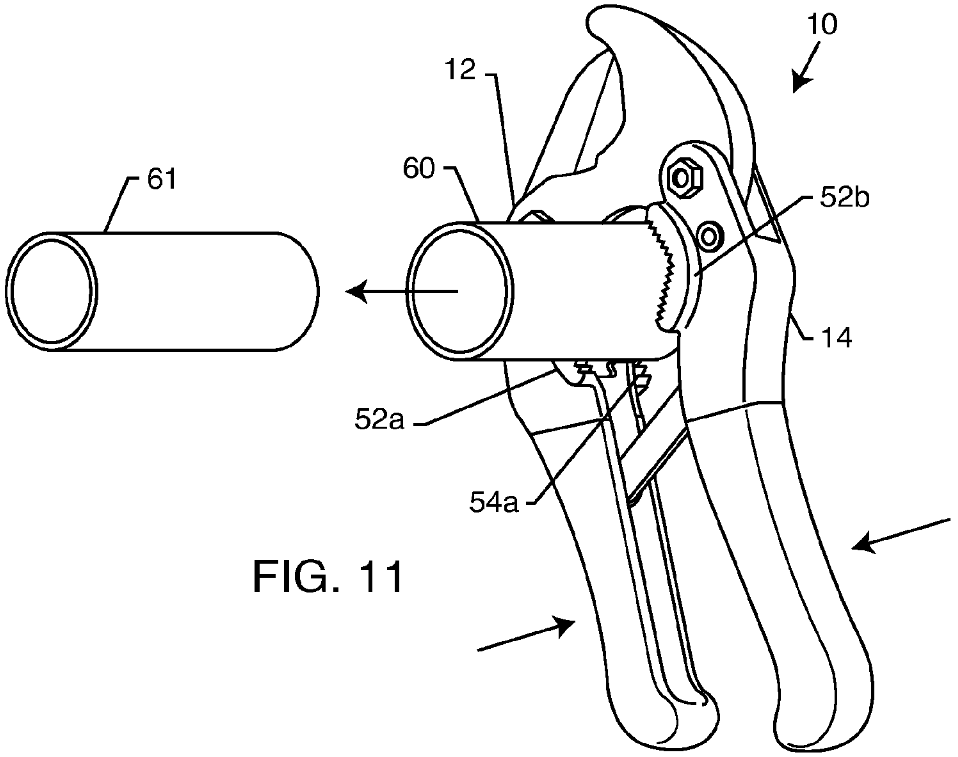
FIG. 11 is an orthogonal view of the multi-function pipe cutting and fitting tool of FIG. 1 firmly gripping a pipe in the pair of plier teeth.

FIGS. 10 and 11 illustrate the use of the pair of plier teeth 52 with a length of pipe 60. FIG. 10 shows the pipe 60 being moved between the pair of plier teeth 52. FIG. 11 illustrates that as the handles 20, 24 are moved closer together the pair of plier teeth 52 firmly grip the pipe 60. In this manner the pipe 60 may be held immobile while another length of pipe 61 is removed or inserted therein.

Figure 12:
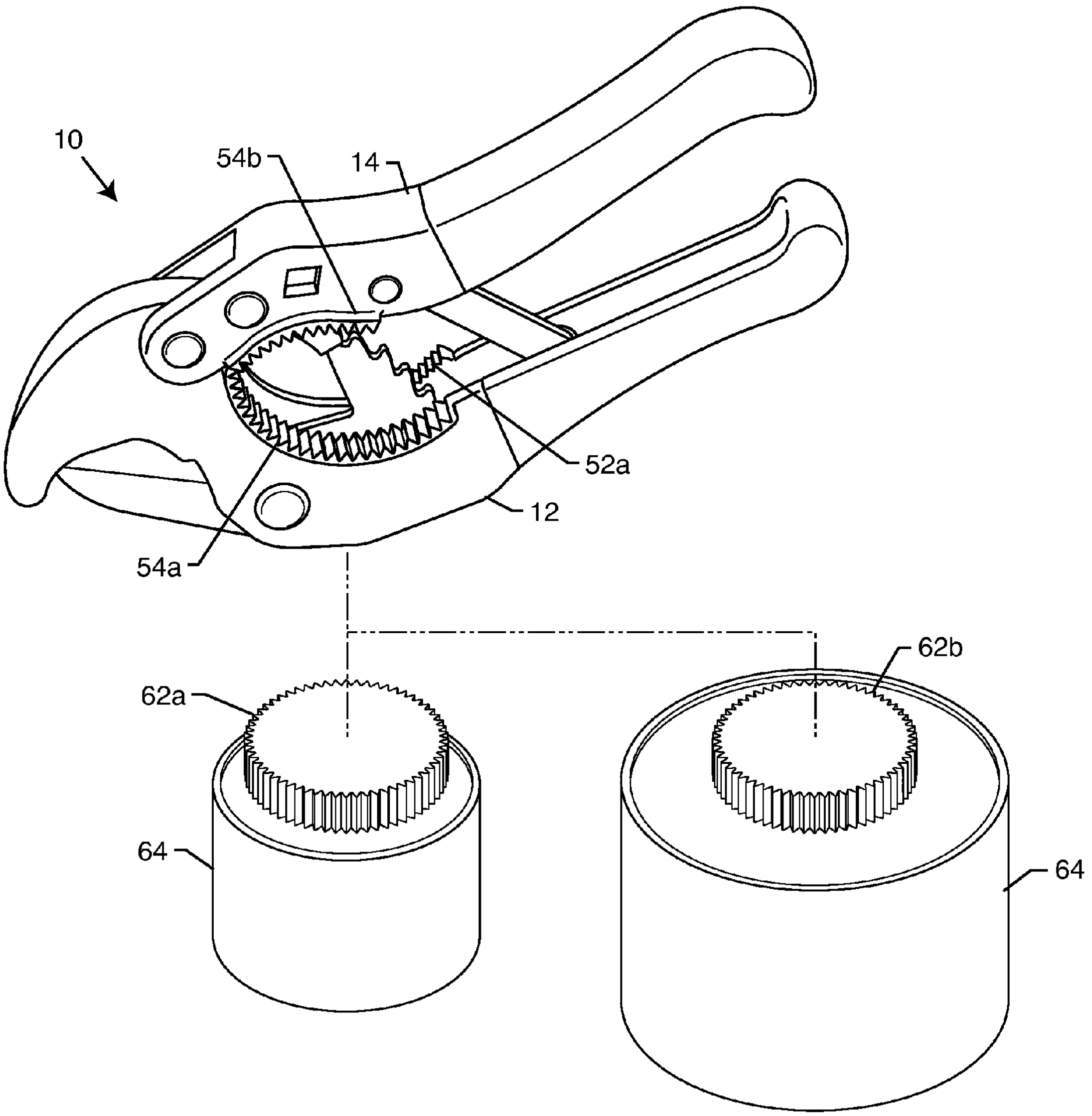
FIG. 12 is an orthogonal view of the multi-function pipe cutting and fitting tool of FIG. 1 illustrating operation of the pair of friction teeth.
Figure 13:
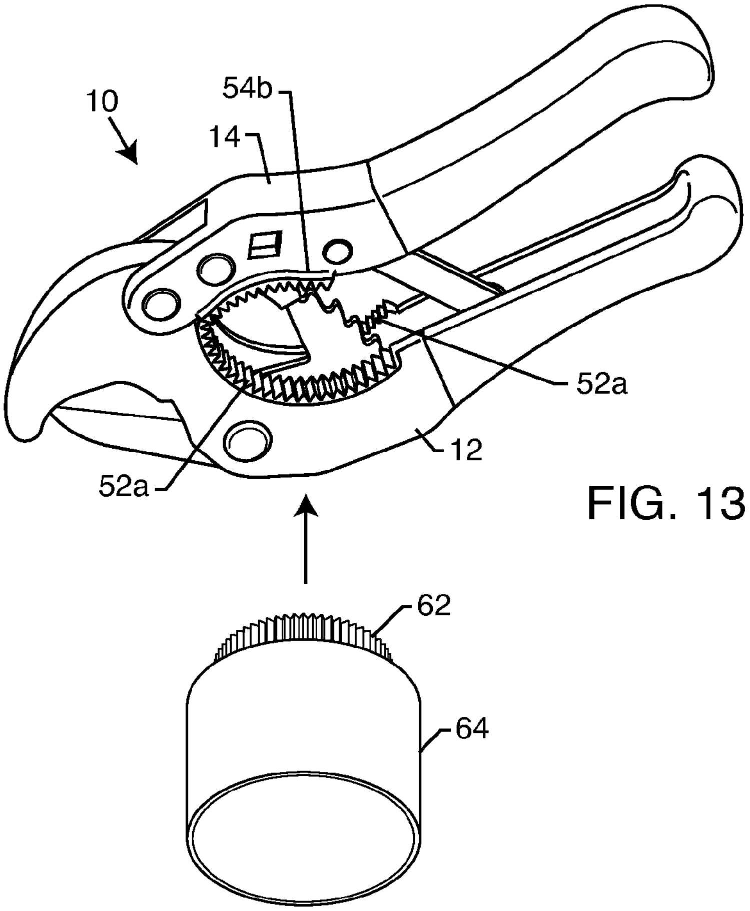
FIG. 13 is an orthogonal view of the multi-function pipe cutting and fitting tool of FIG. 1 illustrating operation of the pair of friction teeth.
Figure 14:
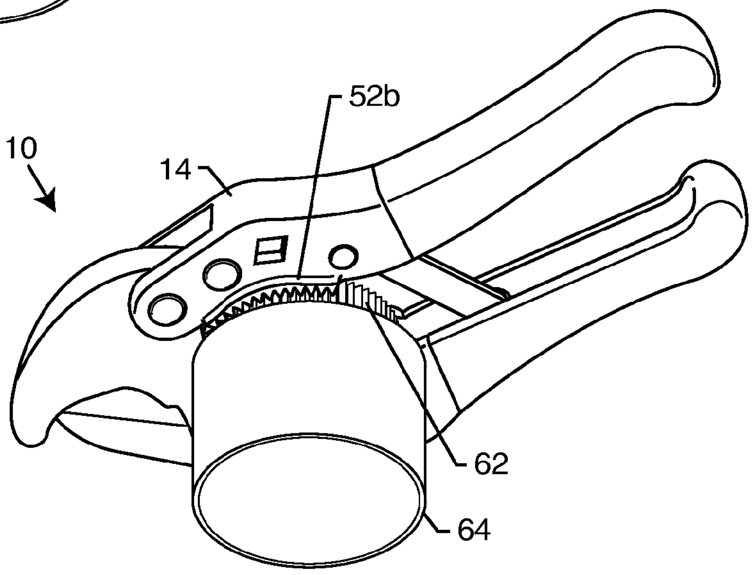
FIG. 14 is an orthogonal view of the multi-function pipe cutting and fitting tool of FIG. 1 engaging an object in the pair of friction teeth.

FIGS. 12-14 illustrate the operation of the pair of friction teeth 54 on an object such as a cap 62 on a can of glue 64. When the cap 62 is placed within the pair of friction teeth 54 and the handles 20, 24 are squeezed together the pair of friction teeth 54 cooperate to engage the cap 62. When the pair of friction teeth 54 are engaged with the cap 62 a user may attain greater leverage on the cap 62 which may be stuck to the can 64. As shown in FIG. 12, the pair of friction teeth 54 are configured such that they may easily engage large caps **62*a* or smaller caps 62*b***.

Although several embodiments have been described in detail for purposes of illustration, various modifications may be made without departing from the scope and spirit of the invention. Accordingly, the invention is not to be limited, except as by the appended claims.

What is claimed is:

1. A multi-function pipe cutting and fitting tool having a fixed handle with a fixed jaw, a pivoting handle pivotally attached to the fixed handle adjacent to the fixed jaw, a movable jaw having a blade pivotally attached to the fixed handle opposite the fixed jaw and configured to engage the fixed jaw, a push pawl pivotally attached to the pivoting handle and having a cantilever spring pin such that upon squeezing the fixed and pivoting handles together the push pawl engages ratchet teeth on the movable jaw to urge the movable jaw into engagement with the fixed jaw, comprising:

a connecting rod having a first end pivotally attached to the pivoting handle and an opposite second end pivotally attached to the movable jaw, and further having a biasing spring connected at one end to the connecting rod and at another end to the fixed handle such that the connecting rod is biased toward the fixed handle; and a pair of teeth on a side of the fixed and pivoting handles proximate to the attachment of the pivoting handle to the fixed handle.

2. The multi-function pipe cutting and fitting tool of claim 1, wherein the connecting rod comprises first and second members hingedly connected, such that the first end is part of the first member, the second end if part of the second member, and the biasing spring is attached to the second member such that the second member is biased toward the fixed handle.

3. The multi-function pipe cutting and fitting tool of claim 1, wherein the pair of teeth comprises a pair of plier teeth positioned in an opposing configuration.

4. The multi-function pipe cutting and fitting tool of claim 3, wherein moving the pivoting handle closer to the fixed handle causes the plier teeth to move closer together thereby firmly gripping an object placed between the pair of plier teeth.

5. The multi-function pipe cutting and fitting tool of claim 1, wherein the pair of teeth comprises a pair of friction teeth positioned in a cooperative configuration.

6. The multi-function pipe cutting and fitting tool of claim 5, wherein moving the pivoting handle closer to the fixed handle causes the friction teeth to angle together thereby engaging an object placed within the pair of friction teeth.

7. A multi-function pipe cutting and fitting tool having a fixed handle with a fixed jaw, a pivoting handle pivotally attached to the fixed handle adjacent to the fixed jaw, a movable jaw having a blade pivotally attached to the fixed handle opposite the fixed jaw and configured to engage the fixed jaw, a push pawl pivotally attached to the pivoting handle and having a cantilever spring pin such that upon squeezing the fixed and pivoting handles together the push pawl engages ratchet teeth on the movable jaw to urge the movable jaw into engagement with the fixed jaw, comprising:

a connecting rod having hingedly connected first and second members, wherein a first end of the first member is pivotally attached to the pivoting handle and an opposite second end of the second member is pivotally attached to the movable jaw, and further having a biasing spring attached at one end to the second member and at another end to the fixed handle such that the connecting rod is biased toward the fixed handle; and a pair of plier teeth positioned in an opposing configuration on a first side of the fixed and pivoting handles proximate to the attachment of the pivoting handle to the fixed handle.

8. The multi-function pipe cutting and fitting tool of claim 7, wherein moving the pivoting handle closer to the fixed handle causes the plier teeth to move closer together thereby firmly gripping an object placed between the pair of plier teeth.

9. The multi-function pipe cutting and fitting tool of claim 7, further comprising a pair of friction teeth positioned in a cooperative configuration on an opposite second side of the fixed and pivoting handles.

10. The multi-function pipe cutting and fitting tool of claim 9, wherein moving the pivoting handle closer to the fixed handle causes the friction teeth to angle together thereby engaging an object placed within the pair of friction teeth.

11. A multi-function pipe cutting and fitting tool having a fixed handle with a fixed jaw, a pivoting handle pivotally attached to the fixed handle adjacent to the fixed jaw, a movable jaw having a blade pivotally attached to the fixed handle opposite the fixed jaw and configured to engage the fixed jaw, a push pawl pivotally attached to the pivoting handle and having a cantilever spring pin such that upon squeezing the fixed and pivoting handles together the push pawl engages ratchet teeth on the movable jaw to urge the movable jaw into engagement with the fixed jaw, comprising:

a connecting rod having hingedly connected first and second members, wherein a first end of the first member is pivotally attached to the pivoting handle and an opposite second end of the second member is pivotally attached to the movable jaw, and further having a biasing spring attached to the second member such that the connecting rod is biased toward the fixed handle; and a pair of friction teeth positioned in a cooperative configuration on a first side of the fixed and pivoting handles proximate to the attachment of the pivoting handle to the fixed handle.

12. The multi-function pipe cutting and fitting tool of claim 11, wherein the pair of teeth comprises a pair of plier teeth positioned in an opposing configuration.

13. The multi-function pipe cutting and fitting tool of claim 12, wherein moving the pivoting handle closer to the fixed handle causes the plier teeth to move closer together thereby firmly gripping an object placed between the pair of plier teeth.

14. The multi-function pipe cutting and fitting tool of claim 11, wherein moving the pivoting handle closer to the fixed handle causes the friction teeth to angle together thereby engaging an object placed within the pair of friction teeth.

15. A multi-function pipe cutting and fitting tool having a fixed handle with a fixed jaw, a pivoting handle pivotally attached to the fixed handle adjacent to the fixed jaw, a movable jaw having a blade pivotally attached to the fixed handle opposite the fixed jaw and configured to engage the fixed jaw, a push pawl pivotally attached to the pivoting handle and having a cantilever spring pin such that upon squeezing the fixed and pivoting handles together the push pawl engages ratchet teeth on the movable jaw to urge the movable jaw into engagement with the fixed jaw, comprising:

a connecting rod having a first end pivotally attached to the pivoting handle and an opposite second end pivotally attached to the movable jaw, and further having a biasing spring connected at one end to the connecting rod and at another end to the fixed handle such that the connecting rod is biased toward the fixed handle;

a pair of plier teeth positioned in an opposing configuration on a first side of the fixed and pivoting handles proximate to the attachment of the pivoting handle to the fixed handle; and a pair of friction teeth positioned in a cooperative configuration on a an opposite second side of the fixed and pivoting handles proximate to the attachment of the pivoting handle to the fixed handle.

16. The multi-function pipe cutting and fitting tool of claim 15, wherein the connecting rod comprises first and second members hingedly connected, such that the first end is part of the first member, the second end if part of the second member, and the biasing spring is attached to the second member such that the second member is biased toward the fixed handle.

17. The multi-function pipe cutting and fitting tool of claim 15, wherein moving the pivoting handle closer to the fixed handle causes the plier teeth to move closer together thereby firmly gripping an object placed between the pair of plier teeth.

18. The multi-function pipe cutting and fitting tool of claim 15, wherein moving the pivoting handle closer to the fixed handle causes the friction teeth to angle together thereby engaging an object placed within the pair of friction teeth.

* * * * *